United States Patent [19]

Orikasa et al.

[11] Patent Number: 5,218,037

[45] Date of Patent: Jun. 8, 1993

[54] THERMOPLASTIC RESIN COMPOSITION AND METHOD FOR PREPARING THE SAME

[75] Inventors: Yuichi Orikasa, Yokohama; Suehiro Sakazume, Fujisawa; Sadahiro Nishimura, Kawasaki; Yoshinori Maki, Chigasaki, all of Japan

[73] Assignees: Nippon Petrochemicals Co., Ltd.; Nippon Oil & Fats Co., Ltd., both of Japan

[21] Appl. No.: 737,881

[22] Filed: Jul. 25, 1991

Related U.S. Application Data

[63] Continuation of Ser. No. 233,149, Aug. 17, 1988, abandoned.

[30] Foreign Application Priority Data

Aug. 17, 1987 [JP] Japan .................. 62-203748
Oct. 27, 1987 [JP] Japan .................. 62-271275
Jan. 27, 1988 [JP] Japan .................. 63-16235

[51] Int. Cl.$^5$ ............... C08L 51/06; C08L 67/02; C08L 69/00; C08L 71/12
[52] U.S. Cl. ................... 524/504; 524/404; 524/423; 524/451; 524/495; 524/508; 524/513; 525/64; 525/67; 525/68; 525/263; 525/277; 525/286; 525/905
[58] Field of Search .......... 525/68, 63, 67, 397, 525/905, 64; 524/504, 508, 513

[56] References Cited

FOREIGN PATENT DOCUMENTS

| 62-27456 | 2/1987 | Japan | 525/66 |
| 62-121760 | 6/1987 | Japan | 525/397 |
| 62-129342 | 6/1987 | Japan | 525/66 |
| 62-129345 | 6/1987 | Japan | 525/397 |
| 62-129349 | 6/1987 | Japan | 525/66 |
| 62-129351 | 6/1987 | Japan | 525/66 |

*Primary Examiner*—Jacob Ziegler
*Attorney, Agent, or Firm*—Ostrolenk, Faber, Gerb & Soffen

[57] ABSTRACT

There is here provided a thermoplastic resin composition which comprises (I) 99 to 1% by weight of an aromatic polyester resin, (II) 1 to 99% by weight of at least one kind of resin selected from the group consisting of a polyphenylene ether resin, a mixture of the polyphenylene ether resin and a styrene polymer, a polycarbonate resin, and a polyarylene sulfide resin, (III) 0.1 to 100 parts by weight, based on 100 parts by weight of the aforesaid resins (I)+(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either of both the components being formed with a dispersion phase having a particle diameter of 0.001 to 10 μm. A method for preparing the above-mentioned thermoplastic resin composition is also provided here.

5 Claims, 2 Drawing Sheets

E-GMA-g-PMMA  |←→| 1μm

E-GMA-MMA  |←→| 1μm

E-GMA/PMMA  ⊢——⊣ 1μm

E-GMA-g-MMA  ⊢——⊣ 1μm

THERMOPLASTIC RESIN COMPOSITION AND METHOD FOR PREPARING THE SAME

This is a Continuation of Application Ser. No. 07/233,149, filed on Aug. 17, 1988, now abandoned.

BACKGROUND OF THE INVENTION

1. Field of the Invention

The present invention relates to a thermoplastic resin composition having excellent impact resistance, heat resistance, chemical resistance, moldability, dimensional stability and appearance of molded articles made therefrom. This composition of the present case can be widely utilized as materials for industrial parts, electrical and electronic machine parts, automobile parts and the like.

2. Description of the Prior Art

Aromatic polyesters, polyphenylene ethers, polycarbonates, polyarylene sulfides are called the so-called engineering plastics. These compounds are believed to have mechanical properties, heat resistance, chemical resistance and the like, and they are used in many fields. In recent years, with regard to the engineering plastics, new additional functions are demanded, and various attempts have been made. One of them is a composition comprising a combination of plural engineering plastics, and this composition has features of the respective plastics and is known as a polymer alloy.

Known examples of such a polymer alloy include (1) an aromatic polyester and a polyphenylene ether, (2) an aromatic polyester, and a polycarbonate, and (3) an aromatic polyester and a polyarylene sulfide.

(1) The aromatic polyester is excellent in moldability and chemical resistance but is poor in dimensional stability and impact strength, particularly notched impact strength inconveniently. For the purpose of solving the problem, a method has been suggested in which a polyphenylene ether is mixed with the aromatic polyester. According to a different standpoint, this mixture also intends to improve moldability and solvent resistance which are drawbacks of the polyphenylene ether. However, these two resins are difficult to disperse into each other, and thus some methods for facilitating the dispersion are disclosed. In Japanese Patent Publication No. 51-21664, Japanese Patent Unexamined Publication No. 48-56742 (U.S. Pat. No. 4,013,613), particularly Japanese Patent Unexamined Publication No. 62-121760 and Japanese Patent Unexamined Publication No. 62-129345, there are described examples using ethylene copolymers modified with epoxy group-containing ethylene copolymers and epoxy group-containing compounds.

However, in the ethyelene copolymer having the epoxy group, the affinity for the aromatic polyester is good but the affinity for the polyphenylene ether is poor, and for this reason, the improvement of the impact resistance is not sufficient.

(2) When the polycarbonate is mixed with the aromatic polyester, the impact strength of the aromatic polyester can be improved, and the solvent resistance and moldability of the polycarbonate can be effectively improved. Examples in which these two resins are mixed with each other are disclosed in U.S. Pat. No. 4,172,859 (Japanese Patent Unexamined Publication No. 51-144452), EP-180648 (Japanese Patent Unexamined Publication No. 60-231757), Japanese Patent Unexamined Publication No. 61-238847, Japanese Patent Unexamined Publication No. 61-252268, Japanese Patent Unexamined Publication No. 61-235456. In these examples, copolymers of glycidyl esters and α-olefins and polyfunctional glycidyl ester compounds are used to obtain compositions excellent in impact resistance, heat resistance, appearance of molded articles made therefrom, and dry heat stability.

However, in the copolymers of glycidyl esters and α-olefins and the polyfunctional glycidyl ester compounds, the affinity for the polycarbonates is insufficient, and therefore compositions having excellent impact resistance and appearance of the molded articles cannot be obtained.

(3) A mixture of the aromatic polyester and the polyaryl sulfide can improve the heat resistance and creep resistance of the aromatic polyester and the moldability of the polyarylene sulfide. Examples of this resin mixture are disclosed in Japanese Patent Unexamined Publication Nos. 62-218441, 62-218442 and 62-218436. In all of these publications, copolymers of glycidyl esters and o-olefins are used to obtain compositions having excellent impact resistance, mechanical properties at high temperatures, hydrolysis resistance and appearance of molded articles. However, in the copolymers of gylcidy esters and α-olefins, the affinity for the polyarylene sulfide is poor, and therefore any compositions which are excellent in impact resistance and appearance of molded articles cannot be obtained.

SUMMARY OF THE INVENTION

The inventors of the present application have intensively researched to solve the above-mentioned problems, and as a result, they have found that when a specific multiphase structure thermoplastic resin is additionally blended as a compatibilizing agent, a composition can be obtained in which impact resistance and appearance of molded articles are excellent, with features of selected resins kept up, and the present invention has been completed.

The first aspect of the present invention is directed to a thermoplastic resin composition containing (I) 99 to 1% by weight of an aromatic polyester resin, (II) 1 to 99% by weight of at least one kind of resin selected from the group consisting of a polyphenylene ether resin, a mixture of the polyphenylene ether resin and a styrene polymer, a polycarbonate resin, and a polyarylene sulfide resin, (III) 0.1 to 100 parts by weight, based on 100 parts by weight of the aforesaid resins (I)+(II), of a multiphase structure thermoplastic resin which is composed of 5 to 95% by weight of an epoxy group-containing olefin copolymer and 95 to 5% by weight of a vinyl polymer or copolymer obtained from at least one kind of vinyl monomer, either of both the components being formed with a dispersion phase having a particle diameter of 0.001 to 10 μm.

The second aspect of the present invention is directed to a method for preparing a thermoplastic resin composition which comprises the step of melting and mixing an aromatic polyester resin (I) and at least one kind of resin (II) selected from the group consisting of a polyphenylene ether resin, a mixture of the polyphenylene ether resin and a styrene polymer, a polycarbonate resin, and a polyarylene sulfide resin with 1 to 100% by weight of a graft polymerization precursor (A) which is obtained by first adding at least one vinyl monomer, at least one radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator, and raising the temperature of this aqueous suspension, when the degree of the impregnation has reached 50% by weight of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of the epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100° to 300° C. in order to form a multi-phase structure thermoplastic resin (III), and then melting and mixing the resin (III) with the resins (I) and (II).

DETAILED DESCRIPTION OF THE INVENTION

Figure 1:
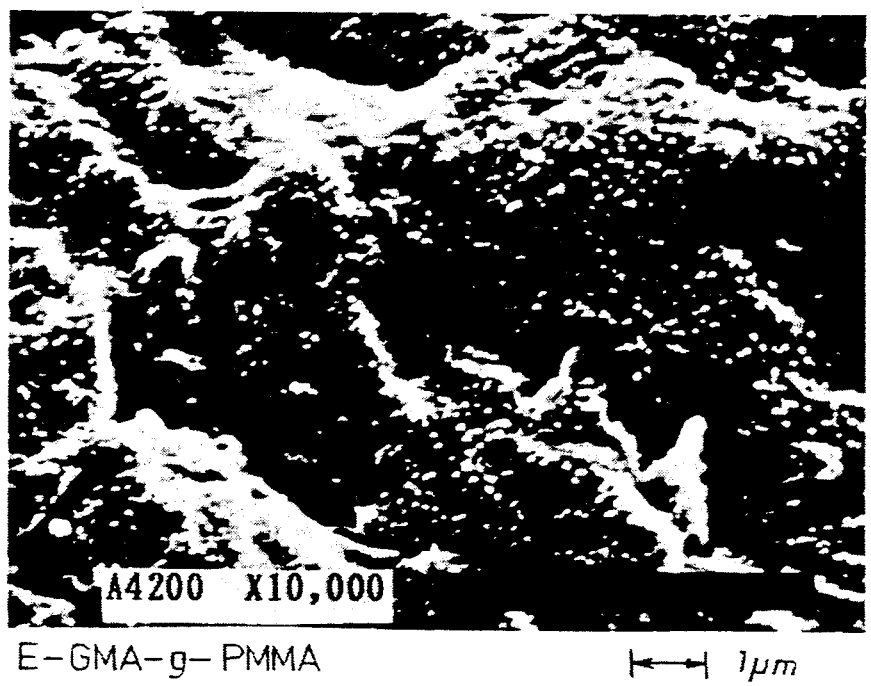
FIG. 1 is the electron microscope photograph of a multi-phase structure thermoplastic resin prepared in Preparation Example 2 in which spherical methyl methacrylate polymer particles having a diameter of 0.1 to 0.2 μm are dispersed in a base polymer matrix comprising ethyleneglycidyl methacrylate copolymer (E-GMA). This photograph is indicated with E-GMA-g-PMMA (multi-phase structure thermoplastic resin).
Figure 2:
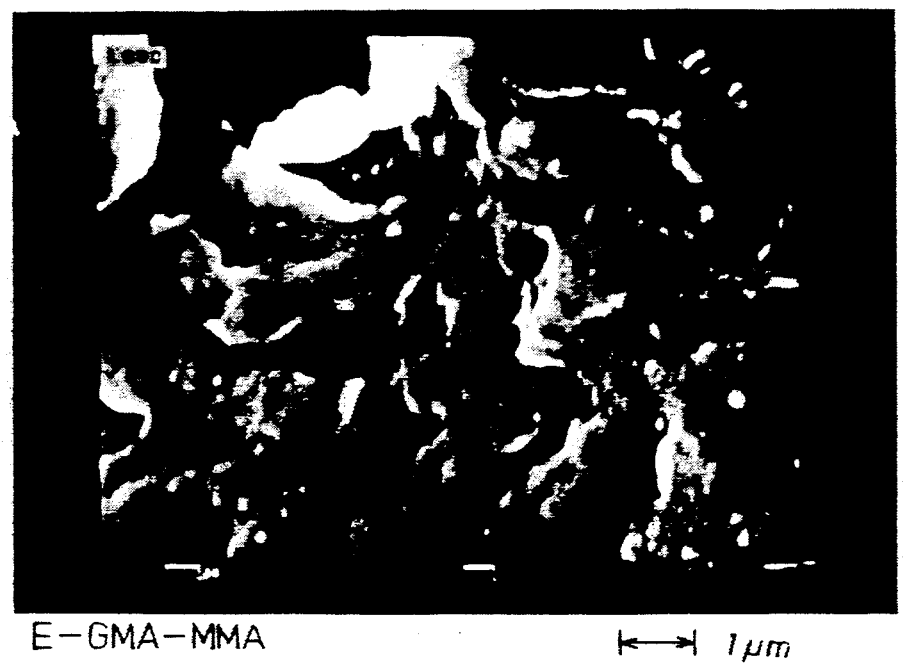
FIG. 2 is the electron microscope photograph of a random terpolymer (Reference Example 1) of an ethyleneglycidyl methacrylate (GMA)-methyl methacrylate prepared by high-pressure radical polymerization. This photograph is indicated with E-GMA-MMA (random terpolymer).
Figure 3:
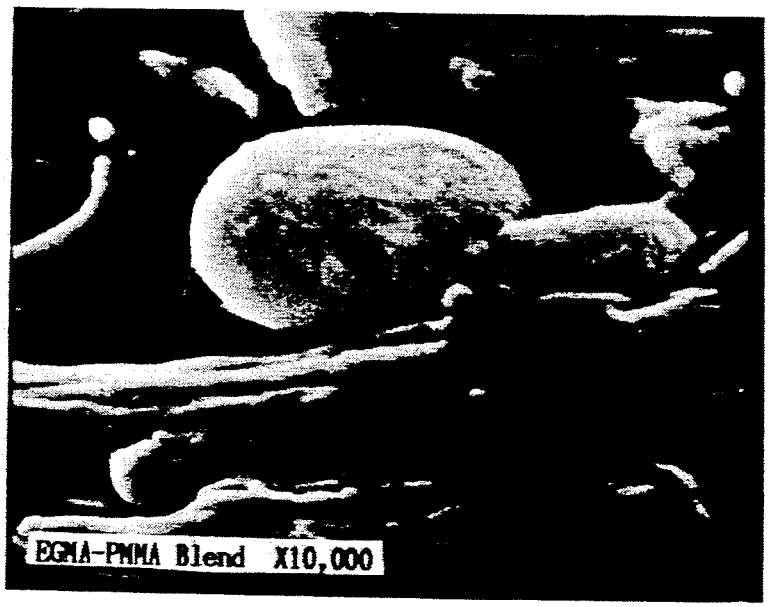
FIG. 3 is the electron microscope photograph of a blend composition (Reference Example 2) which is prepared by first blending E-GMA used in Preparation Example 1 with 30% by weight of polymethyl methacrylate (PMMA) and then mixing them under melting. This photograph is indicated with E-GMA/PMMA (blend polymer).
Figure 4:
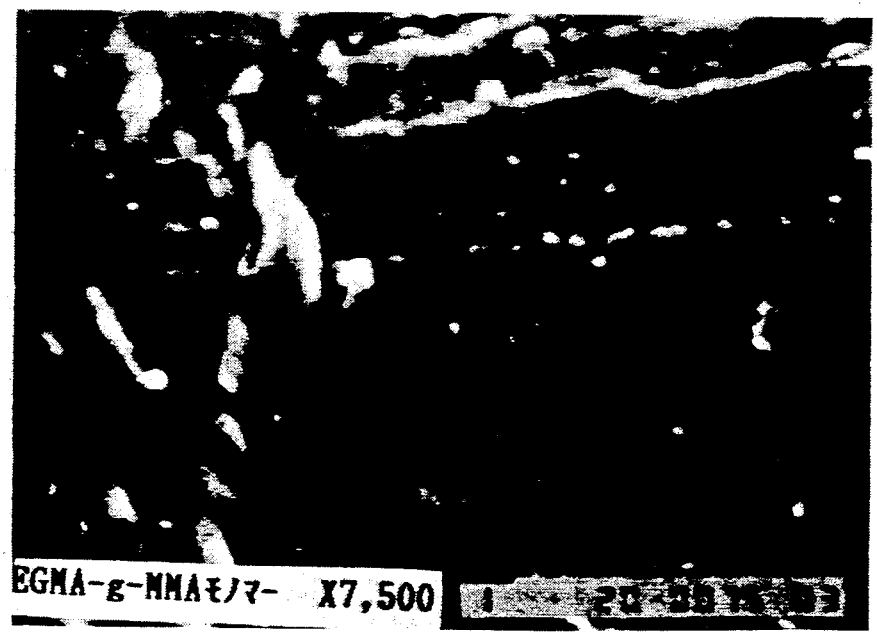
FIG. 4 is the electron microscope photograph of a short-chain graft polymer prepared by reacting E-GMA copolymer used in Preparation Example 1 with methyl methacrylate in a usual grafting manner. This photograph is indicated with E-GMA-g-MMA (short-chain graft polymer).

An aromatic polyester resin used in the present invention is a polyester having an aromatic ring in a chain unit of the polymer, and in other words, it is a polymer or copolymer prepared by subjecting the main components of an aromatic dicarboxylic acid (or a derivative capable of forming the ester) and a diol (or a derivative capable of forming the ester) to condensation reaction.

Examples of the above-mentioned aromatic dicarboxylic acid include terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyldicarboxylic acid, 4,4'-diphenyl ether dicarboxylic acid, 1,2-bis(phenoxy)ethane-4,4'-dicarboxylic acid and derivatives capable of forming the aromatic polyester.

Furthermore, examples of the diol include aliphatic diols each having 2 to 10 carbon atoms, such as ethylene glycol, propylene glycol, 1,4-butanediol, neopentyl glycol, 1,5-pentanediol, 1,6-hexanediol, decamethylene diglycol and cyclohexanediol; and long-chain glycols each having a molecular weight of 400 to 6,000, such as polyethylene glycol, poly-1,3-propylene glycol, polytetramethylene glycol and mixtures thereof.

Typical and preferable examples of the thermoplastic aromatic polyester resin used in the present invention include polyethylene terephthalate, polypropylene terephthalate, polybutylene terephthalate, polyhexamethylene terephthalate, polyethylene-2,6-naphthalate and polyethylene-1,2-bis(phenoxy)ethane-4,4'-dicarboxylate. More preferable aromatic polyester resins are polyethylene terephthalate and polybutylene terephthalate.

The intrinsic viscosity of the thermoplastic aromatic polyester resin can be measured at 25°±0.1° C. at a polyester concentration of 0.32 g in 100 ml of a mixture of trifluoroacetic acid and methylene chloride in a ratio of 25:75. Preferably, the intrinsic viscosity is in the range of 0.4 to 4.0 dl/g. When the intrinsic viscosity is less than 0.4 dl/g, the thermoplastic aromatic polyester resin cannot exert sufficient mechanical strength unpreferably. Inversely, when it is in excess of 4.0 dl/g, the flowability of the aromatic polyester deteriorates in melting the latter, so that luster on the surface of molded articles thereof degrades unpreferably.

The polyphenylene ether resin used in the present invention is a polymer obtained by oxidizing and polymerizing a phenolic compound represented by the general formula

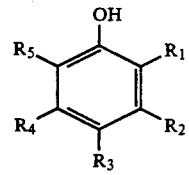

wherein each of $R_1$, $R_2$, $R_3$, $R_4$ and $R_5$ is selected from the group consisting of a hydrogen atom, a halogen atom, a hydrocarbon group or a substituted hydrocarbon group, and at least one of them is a hydrogen atom, with oxygen or an oxygen-containing gas in the presence of a coupling catalyst.

Typical examples of $R_1$, $R_2$, $R_3$, $R_4$ and $R_5$ in the above-mentioned general formula include hydrogen, chlorine, fluorine, iodine, bromine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methyphenyl, dimethylphenyl and ethylphenyl.

Typical examples of the phenolic compounds having the above-mentioned general formula include phenol, o-, m- and p-cresols, 2,6-, 2,5-, 2,4- and 3,5-dimethylphenols, 2-methyl-6-phenylphenol, 2,6-diphenylphenol, 2,6-dimethylphenol, 2-methyl-6-ethylphenol, and 2,3,5-, 2,3,6- and 2,4,6-trimethylphenols.

These phenolic compounds may be used in a combination of two or more thereof.

Other examples of the phenolic compound used in the present invention include copolymers of the phenolic compounds having the above general formula with divalent phenols such as bisphenol A, tetrabromobisphenol A, resorcin and hydroquinone.

Examples of the styrene polymer used in the present invention include homopolymers such as polystyrene, poly(α-methylstyrene) and poly(p-methylstyrene), polystyrenes modified with butadiene rubber, styrene-butadiene copolymer, ethylene-propylene copolymer and ethylene-propylene-diene copolymer, styrene-maleic anhydride copolymer, styreneacrylonitrile copolymer, styrene-acrylonitrile-butadiene copolymer and styrene-methylmethacrylate copolymer. The styrene copolymer is used in an amount of 0 to 95% by weight with respect to the polyphenylene ether resin.

The polycarbonate resin used in the present invention include 4,4-dioxyallylalkane polycarbonates typified by a polycarbonate of 4,4-dihydroxydiphenyl-2,2-propane (generally called bisphenol A), but above all, 4,4-dihydroxydiphenyl-2,2-propane polycarbonate having a number average molecular weight of 15,000 to 80,000 is preferable. This polycarbonate may be prepared by an optional method. For example, 4,4-dihydroxydiphenyl-2,2-propane polycarbonate may be prepared by blowing phosgene in 4,4-dihydroxydiphenyl-2,2-propane as a dioxine compound in the presence of an aqueous caustic alkali solution and a solvent, or alternatively by carrying out ester interchange between 4,4-dihydroxydiphenyl-2,2-propane and diester carbonate in the presence of a catalyst.

The polyarylene sulfide resin used in the present invention is a polymer represented by the general formula

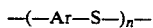

wherein examples of Ar include divalent aromatic residues each containing at least one carbon six-member ring such as

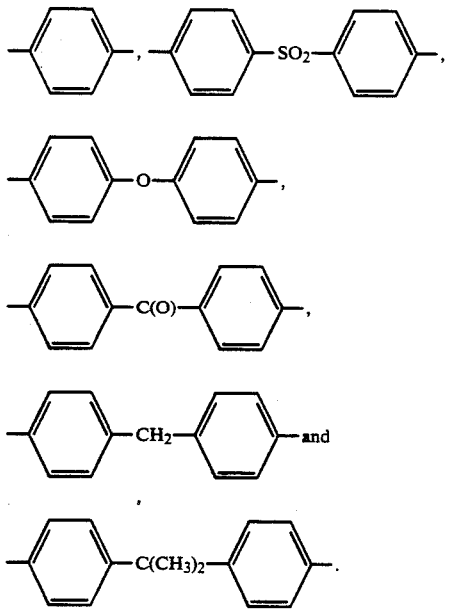

Furthermore, substituent groups such as F, Cl, Br and CH may be introduced the aromatic ring. The particularly typical one is the polyarylene sulfide (hereinafter referred to as PPS) represented by the general formula

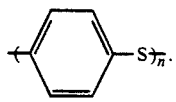

A method for preparing PPS is disclosed in Japanese Patent Publication No. 54-3368. That is, PPS may be prepared by reacting paradichlorobenzene with sodium sulfide at a temperature of 160° to 250° C. under pressure in an N-methylpiloridone solution.

The epoxy group-containing olefin copolymer used in the multi-phase structure thermoplastic resin regarding the present invention is a copolymer of an olefin and an unsaturated glycidyl group-containing monomer, or a terpolymer of an olefin, an unsaturated glycidyl group-containing monomer and another unsaturated monomer, or a multicomponent copolymer. The particularly preferable olefin of the copolymer is ethylene, and the preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of maleic acid, crotonic acid and fumaric acid, allyl glycidyl ether, glycidyloxy ethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, viny esters, α,β-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and viny ethyl ether, and acrylic amide compounds. Particularly, acrylic and methacrylic esters are preferable.

Typical examples of the epoxy group-containing olefin copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethyleneglycidyl methacrylate copolymer, ethylene-ethyl acrylateglycidyl methacrylate copolymer and ethylene-vinyl acetateglycidyl methacrylate copolymer are preferred.

These epoxy group-containing olefin copolymers can be used in a mixture thereof.

The above-mentioned epoxy group-containing olefin copolymer may be prepared preferably by a high-pressure radical polymerization. That is, the epoxy group-containing olefin copolymer may be prepared by simultaneously or stepwise contacting and polymerizing a monomer mixture of 60 to 99.5% by weight of the above-mentioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg/cm², preferably 1,000 to 3,500 kg/cm², at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Other examples of the epoxy group-containing olefin copolymer used in the present invention include modified compounds prepared by the addition reaction between the above-mentioned unsaturated glycidyl group-containing monomers and conventional olefin homopolymers and copolymers.

Examples of the above-mentioned olefin homopolymer include low-density, medium-density and high-density polyethylenes, polypropylene, polybutene-1 and poly-4-methylpentene-1, and examples of the above-mentioned copolymers include ethylene-propylene copolymer; ethylenebutene-1 copolymer; ethylene-hexene-1 copolymer; ethylene-4-methylpentene-1 copolymer; copolymers with other α-olefins mainly comprising ethylene such as ethylene-octene-1 copolymer; copolymers with other α-olefins mainly comprising propylene such as propylene-ethylene block copolymer; ethylene-vinyl acetate copolymer; ethylene-acrylic acid copolymer; ethylene-methacrylic acid copolymer; copolymers of ethylene and methyl, ethyl, propyl, isopropyl and butyl acrylate and methacrylate; ethylene-maleic acid copolymer; ethylene-propylene copolymer rubber; ethylene-propylene-diene-copolymer rubber; liquid polybutadiene; etylene-vinyl acetate-vinyl chloride copolymer; and mixtures thereof.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, vinyl aromatic monomers, acrylonitrile and methacrylonitrile monomers and vinyl ester monomers are particularly preferable.

The multi-phase structure thermoplastic resin used in the present invention is an epoxy group-containing olefin copolymer or a vinyl polymer or copolymer matrix in which another vinyl polymer or copolymer, or epoxy group-containing olefin copolymer is uniformly dispersed in a spherical form.

The polymer dispersed in the matrix has a particle diameter of 0.001 to 10 μm, preferably 0.01 to 5 μm. When the particle diameter of the dispersed polymer is less than 0.001 μm or is more than 10 μm, compatibility to the resin is bad, with the result that, for example, the appearance of articles made therefrom deteriorates or the improvement effect of impact resistance is unpreferably insufficient.

The vinyl polymer or copolymer in the multi-phase thermoplastic resin used in the present invention has a number average polymerization degree of 5 to 10,000, preferably 10 to 5,000.

When the number average polymerization degree is less than 5, impact resistance can not be improved, and inversely, when it is in excess of 10,000, melting viscosity is high, moldability deteriorates, and surface luster falls off unpreferably.

The multi-phase thermoplastic resin used in the present invention comprises 5 to 95% by weight, preferably 20 to 90% by weight, of the ethylene copolymer. Therefore, the content of the vinyl polymer or copolymer is 95 to 5% by weight, preferably 80 to 10% by weight.

When the content of the epoxy group-containing copolymer is less than 5% by weight, the improvement effect of impact resistance is poor, and inversely when it is in excess of 95% by weight, heat resistance is impaired unpreferably, though the impact resistance is sufficiently improved.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an epoxy group-containing olefin copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the ethylene copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the ethylene copolymer, thereby obtaining a graft polymerization precursor (A).

This graft polymerization precursor (A) also is the multi-phase structure thermoplastic resin. Therefore, the thus obtained graft polymerization precursor (A) may be directly melted and mixed with an aromatic polyester resin and at least one resin selected from the group consisting of a polyphenylene ether resin, a mixture of the polyphenylene ether resin and a styrene polymer, a polycarbonate resin and a polyarylene sulfide.

Furthermore, the multi-phase thermoplastic resin (III) of the present invention can be obtained by kneading the graft polymerization precursor (A) under melting at 100° to 300° C. Alternatively, the epoxy group-containing olefine copolymer (b) or the vinyl polymer or copolymer (C) may be mixed with the graft polymerization precursor, and the mixture may be then kneaded under melting to obtain the multi-phase structure thermoplastic resin (III).

The most preferable multi-phase structure thermoplastic resin (III) can be obtained kneading the graft polymerization precursor.

The above-mentioned radical polymerizable or copolymerizable organic peroxides are compounds represented by the general formulae (a) and (b):

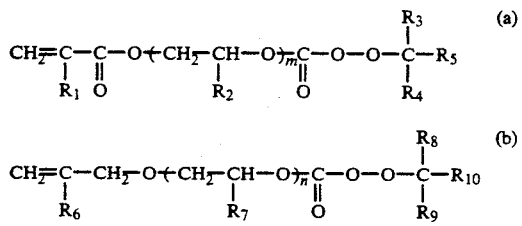

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylperoxyacryloyloxyethyl carbonate, t-butylperoxymethacryloyloxyethyl carbonate, t-amylperoxymethacryloyloxyethyl carbonate, 1,1,3,3-tetramethylbutylperoxymethacryloyloxyethyl carbonate, cumylperoxymethacryloyloxyethyl carbonate, p-isopropylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylperoxymethacryloyloxyethoxyethyl carbonate, t-butylperoxyacryloyloxyisopropyl carbonate, t-amylperoxymacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, amounts of the above-mentioned resins (I) and (II) depend upon a purpose of the composition of the present invention.

That is, when it is aimed that features of the aromatic polyester resin are retained and poor dimensional stability and notched impact strength which are drawbacks of the resin are improved, there is required 50 to 99% by weight, preferably 60 to 95% by weight, of the aromatic polyester resin.

When the aromatic polyester resin is less than 50% by weight, excellent moldability and chemical resistance which are features of the aromatic polyester resin are impaired, and when it is in excess of 99% by weight, the dimensional stability which is one of the purposes of the present invention is not improved sufficiently.

If it is aimed that the features of the polyphenylene ether are retained and the poor moldability and chemical resistance which are drawbacks of the ether are improved, there is required 50 to 99% by weight, preferably 60 to 95% by weight, of the polyphenylene ether.

When the amount of the polyphenylene ether is less than 50% by weight, heat resistance and dimensional stability of the polyphenylene ether are impaired, and when it is in excess of 99% by weight, the improvement effect of moldability and chemical resistance which is one of the purposes of the present invention is not obtained.

If it is aimed that chemical resistance and moldability are improved retaining the feature of the polycarbonate, there is required 50 to 99% by weight, preferably 60 to 95% by weight, of the polycarbonate.

When the amount of the polycarbonate is less than 50% by weight, excellent impact resistance which is the feature of the polycarbonate is impaired, and when it is in excess of 99% by weight, the improvement effect of chemical resistance and moldability which is one of the purposes of the present invention is not obtained.

If it is aimed that moldability is improved retaining the feature of the polyarylene sulfide, there is required 50 to 99% by weight, preferably 60 to 95% by weight, of the polyarylene sulfide.

When the amount of the polyarylene sulfide is less than 50% by weight, excellent heat resistance and creep resistance which are features of the polyarylene sulfide are impaired, and when it is in excess of 99% by weight, the improvement effect of moldability which is one of the purposes of the present invention is not expected In the present invention, the multi-phase structure thermoplastic resin is used in an amount of 0.1 to 100 parts by weight, preferably 1 to 50 parts by weight, based on 100 parts by weight of the total weight of the resins (I)+(II).

When the amount of the multi-phase structure thermoplastic resin is less than 0.1 part by weight, any compatibility effect is not present, impact strength deteriorates, and layer peeling occurs on molded articles, with the result that the appearance of the articles is degraded. When it is in excess of 100 parts by weight, stiffness and heat resistance of the composition of the present invention deteriorate unpreferably.

In the present invention, the inorganic filler (IV) can be used in an amount of 1 to 150 parts by weight based on 100 parts of the components (I)+(II)+(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably. Inversely, when it is less than 1 part by weight, any modification effect cannot be exerted.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

The thermoplastic composition of the present invention may be manufactured by melting and mixing the abovementioned components (I)+(II)+(III) at a temperature of 230° to 350° C.

The components (I), (II) and (III) may be mixed simultaneously, but it is preferred that after one of the components (I) and (II) and the component (III) are first melted and mixed, the other of the components (I) and (II) is then mixed with the resulting mixture. Particularly in the case of the resin which will be in the state of a disperse phase, it is suitable that such a resin is uniformly and finely mixed.

In melting and mixing, there may be used a usual kneader such as a mixing roll mill, a Banbury's mixer, a kneader mixer, a kneading extruder, a biaxial extruder and rolls.

In the present invention, various additives can be used, in so far as they do not deviate from the gist of the present invention. Examples of such usable additives include another thermoplastic resin such as polyolefin resin, polyvinyl chloride resin, polyvinylidene chloride resin, ABS resin, fluorine-contained resin, polyoxymethylene resin, polyamide resin or polysulfone resin, a natural rubber, a synthetic rubber, an inorganic flame retardant such as magnesium hydroxide or aluminum hydroxide, a usual halogen or phosphorus series flame retardant, an organic flame retardant, e.g., a halogenated polystyrene such as brominated polystyrene, brominated poly-e-methylstyrene or a derivative thereof, a halognated polycarbonate such as borminated polycarbonate, a halogenated polyester such as polyalkylene tetrabromoterephthalate or brominated terephthalic acid series polyester, a halogenated epoxy compound such as halogenated bisphenol series epoxy resin, a hlogenated polyphenylene oxide compound such as poly(dibromophenylene oxide), and a high-molecular type halogen-containing polymer such as a cyanuric acid ester compound of halogenated bisphenol, a flame retardant auxiliary of an antimony compound such as antimony trixode, antimony pentaxoide, antimony trichloride, antimony trisulfide, antimony pentasulfide, sodium antimonate, antimony tartrate or metallic antimony, an antioxidant, an ultraviolet inhibitor, a lubricant, a dispersant, a foaming agent, a crosslinkinhg agent, and a colorant.

Now, the present invention will be described in detail in reference to examples.

PREPARATION EXAMPLE 1

Preparation of Multi-phase Structure Thermoplastic Resin IIIa

In a 5-liter stainless steel autoclave was placed 2,500 g of pure water, and 2.5 g of polyvinyl alcohol was dissolved therein as a suspending agent. In the solution was placed 700 g of ethylene-glycidyl methacrylate copolymer as an epoxy group-containing olefin copolymer (content of glycidyl methacrylate=15% by weight) (trade name Rexpearl J-3700; made by Nippon Petrochemicals Co., Ltd.), followed by stirring to suspend the copolymer therein in a nitrogen atmosphere. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 hg of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the epoxy group-containing olefin copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor IIIa'. The styrene polymer was extracted from this graft polymerization precursor with ethyl acetate, and according to measurement by the use of GPC, the number average polymerization degree of the styrene polymer was 900.

Next, this graft polymerization precursor was extruded at 200° C. by a plastomill monoaxial extruder (Toyo Seiki Seisaku-sho Ltd.) to perform graft reaction, whereby a multi-phase structure thermoplastic resin IIIa This multi-phase structure thermoplastic resin was then observed by a scanning type electron microscope (trade name JEOL JSM T300; made by JEOL, Ltd ), and it was found that it was a multi-phase structure thermoplastic resin in which spherical resin particles each having a diameter of 0.3 to 0.4 μm were uniformly dispersed. In this case, the grafting efficiency of the styrene polymer was 49.0% by weight

PREPARATION EXAMPLE 2

Preparation of Multi-phase Structure Thermoplastic Resin IIIb

The same procedure as in Preparation Example 1 was repeated with the exception that 300 g of styrene as a vinyl monomer was replaced with 300 g of a methyl methacrylate monomer and 0.6 g of n-dodecylmercaptan as a molecular weight modifier was used, thereby preparing multi-phase structure thermoplastic resin IIIb via a graft polymerization precursor IIIb' (number average polymerization degree of methyl methacrylate polymer=700). The average diameter of the resin particles dispersed in this resin composition; was from 0.1 to 0.2 μm, as seen in Photograph No. 1 (E-GMA-g-PMMA).

REFERENCE EXAMPLE 1

Preparation of Random Copolymer

In a 3.8-liter reactor equipped with a stirrer were placed a mixture of 1,600 g of ethylene, 32 g of glycidyl methacrylate and 40 g of methyl methacrylate, and in the presence of 200 g of n-hexane as a chain transfer agent and 0.0012% by weight of a radical polymerization initiator (di-tert-butyl peroxide) based on the total weight of the mixture, reaction was then performed at a polymerization pressure of 1,600 kg/cm² at a reaction temperature of 170° C., thereby obtaining ethylene-glycidyl methacrylate-methyl methacrylate random terpolymer. Photograph No. 2 (E-GMA-MMA) shows the observational result of the random terpolymer by the use of an electron microscope.

The results indicate that the random copolymer does not have such a multi-phase structure as in the present invention.

REFERENCE EXAMPLE 2

Preparation of Blend

The epoxy group-containing ethylene copolymer used in Preparation Example 1 was blended with 30% by weight of polymethyl methacrylate (trade name Acrypet MD; made by Mitsubushi Rayon Co., Ltd.), and they were mixed at 250° C. under melting. The blend was observed through an electron microscope, and the results are shown in Photograph No. 3 (E-GMA/PMMA).

In the blend, a particle size of the dispersed polymethyl methacrylate is great, and therefore the structure of the polymer is noticeably different from the multi-phase structure of the present invention.

REFERENCE EXAMPLE 3

In a high-speed shear mixer, 950 g of ethylene-glycidyl methacrylate copolymer used in Preparation Example 1 was mixed, at ordinary temperature for 5 minutes, with a solution in which 0.5 g of dicumyl peroxide (trade name Percumyl D; made by Nippon Oils & Fats Co., Ltd.) was dissolved in 50 g of methyl methacrylate. The mixture was then extruded at 200° C. by an extruder, and graft reaction was performed in a usual grafting manner in order to obtain a short-chain graft polymer. The structure of the thus obtained graft polymer can be observed from the electron microscope photograph of Photograph No. 4 (E-GMA-g-MMA).

The results in the photograph indicate that the above-mentioned short-chain graft polymer does not have such a multi-phase structure as seen in the polymer prepared in Preparation Example 1, but a single-phase structure.

EXAMPLES 1 to 11

Polybutylene terephthalate (which was denoted by PBT in tables) having an intrinsic viscosity of 3.5 dl/g, poly-2,6-dimethyl-1,4-phenylene ether (which was denoted by PPE in tables), modified PPE (trade name Nolyl 534J; made by Engineering Plastics Co., Ltd.) and the multi-phase structure thermoplastic resin IIIa obtained in Preparation Example 1 were melted and blended together in ratios in Table 1.

In melting and mixing the materials, they were fed to a one-direction rotating diaxial extruder having a screw diameter of 30 mm a temperature of which was set to 250° C. Afterward, the mixture was extruded and then formed into grains.

Next, specimens were prepared therefrom by an injection molding machine having cylinder and mold temperatures were 260° C. and 80° C., respectively. Sizes of the specimens were as follows:

| | |
|---|---|
| Specimens for notched izod impact strength | 13 × 65 × 6 mm |
| Specimens for heat distortion temperature | 13 × 128 × 6 mm |
| Specimens for tensile test | 13 × 220 × 6 mm |
| Test procedures were as follows: | |
| (1) Notched izod impact strength | JIS K7110 |
| (2) Heat distortion temperature (18.6 kg/cm²) | JIS K7207 |
| (3) Elongation at break | JIS k7113 |

TABLE 1-1

| Example | 1 | 2 | 3 | 4 | 5 |
|---|---|---|---|---|---|
| PBT (wt %) | 80 | 80 | 80 | 60 | 60 |
| PPE (wt %) | 20 | 20 | 20 | 40 | 40 |
| Multi-phase Structure Thermoplastic Resin IIIa* | 3 | 5 | 10 | 3 | 5 |
| Notched Izod Impact Strength (kg · cm/cm) | 9 | 15 | 17 | 10 | 20 |
| Heat Distortion Temperature (°C.) (18.6 kg/cm$^2$) | 89 | 88 | 86 | 112 | 109 |
| Elongation at Break (%) | 85 | 100 | 130 | 80 | 110 |

*Parts by weight based on 100 parts by weight of PBT + PPE.

TABLE 1-2

| Example | 6 | 7 | 8 | 9 | 10 | 11 |
|---|---|---|---|---|---|---|
| PBT (wt %) | 60 | 50 | 50 | 40 | 60 | 40 |
| PPE (wt %) | 40 | 50 | 50 | 60 | — | — |
| Modified PPE (wt %) | — | — | — | — | 40 | 60 |
| Multi-phase Structure Thermoplastic Resin IIIa* | 10 | 3 | 5 | 5 | 10 | 5 |
| Notched Izod Impact Strength (kg · cm/cm) | 25 | 13 | 15 | 14 | 27 | 17 |
| Heat Distortion Temperature (°C.) (18.6 kg/cm2) | 107 | 122 | 121 | 124 | 101 | 118 |
| Elongation at Break (%) | 125 | 90 | 105 | 95 | 108 | 100 |

*Parts by weight based on 100 parts by weight of PBT + PPE.

EXAMPLES 12 TO 16

The same evaluation as in Example 1 was made using the graft polymerization precursor (IIIa') obtained in Preparation Example 1. The results are set forth in Table 2.

TABLE 2

| Example | 12 | 13 | 14 | 15 | 16 |
|---|---|---|---|---|---|
| PBT (wt %) | 60 | 60 | 50 | 60 | 50 |
| PPE (wt %) | 40 | 40 | 50 | — | — |
| Modified PPE (wt %) | — | — | — | 40 | 50 |
| Graft Polymerization Precursor (IIIa')* | 3 | 5 | 10 | 5 | 10 |
| Notched Izod Impact Strength (kg · cm/cm) | 9 | 15 | 17 | 13 | 20 |
| Heat Distortion Temperature (°C.) (18.6 kg/cm$^2$) | 89 | 88 | 86 | 93 | 90 |
| Elongation at Break (%) | 85 | 100 | 130 | 106 | 133 |

*Parts by weight based on 100 parts by weight of PBT + PPE.

EXAMPLE 17 TO 21

The same procedure as in the above examples was repeated with the exception that a glass fiber having an average fiber length of 5.0 mm and a diameter of 10 μm was additionally blended. The results are set forth in Table 3.

TABLE 3

| Example | 17 | 18 | 19 | 20 | 21 |
|---|---|---|---|---|---|
| PBT (wt %) | 80 | 60 | 60 | 50 | 60 |
| PPE (wt %) | 20 | 40 | 40 | 50 | — |
| Modified PPE (wt %) | — | — | — | — | 40 |
| Multi-phase Structure Thermoplastic Resin IIIa* | 10 | 5 | — | 5 | 5 |
| Graft Polymerization Precursor (IIIa')* | — | — | 5 | — | — |
| Glass Fiber (wt %)* | 30 | 30 | 30 | 30 | 30 |
| Notched Izod Impact Strength (kg · cm/cm) | 18 | 19 | 16 | 14 | 13 |
| Heat Distortion Temperature (°C.) (18.6 kg/cm$^2$) | 136 | 146 | 139 | 152 | 135 |
| Elongation at Break (%) | 85 | 100 | 130 | 106 | 133 |

*Parts by weight based on 100 parts by weight of PBT + PPE.

COMPARATIVE EXAMPLE 1 TO 6

The same procedure as in Example 1 was repeated with the exception that the multi-phase structure thermoplastic resins in Example 1 were replaced with the ethylene-glycidyl methacrylate copolymer used in Preparation Example 1, the blend obtained in Reference Example 2 and the short-chain graft polymer obtained in Reference Example 3. The results are set forth in Table 4.

TABLE 4

| Comp. Example | 1 | 2 | 3 | 4 | 5 | 6 |
|---|---|---|---|---|---|---|
| PBT (wt %) | 80 | 60 | 60 | 50 | 60 | 60 |
| PPE (wt %) | 20 | 40 | 40 | 50 | 40 | 40 |
| Ethylene-Glycidyl Methacrylate Copolymer* | 5 | 5 | 10 | 10 | — | — |
| Blend* | — | — | — | — | 10 | — |
| Short-Chain Graft Polymer* | — | — | — | — | — | 10 |
| Notched Izod Impact Strength (kg · cm/cm) | 7 | 10 | 13 | 8 | 3 | 17 |
| Heat Distortion Temperature (°C.) (18.6 kg/cm$^2$) | 86 | 103 | 93 | 118 | 88 | 115 |
| Elongation at Break (%) | 90 | 100 | 115 | 90 | 30 | 113 |

*Parts by weight based on 100 parts by weight of PBT + PPE.

EXAMPLES 22 TO 29

Polycarbonate resin having a number average molecular weight of 62,000, polybutylene terephthalate (which was denoted by PBT in tables) having an intrinsic viscosity of 3.5 dl/g, and the multi-phase structure thermoplastic resins IIIa and IIIb obtained in Preparation Examples 1 and 2 were melted and mixed with one another in ratios shown in Table 5.

The above-mentioned melting and mixing operations as well as the formation of specimens were carried out in the same manners as in Example 1.

Chemical resistance was evaluated by observing the appearance of the specimens after the immersion thereof at 75° C. for 30 days in methanol. The evaluation was ranked as follows:

○ . . . Not changed after the immersion in methanol.
Δ . . . Occurrence of cracks on the specimen and partial dissolution thereof.
X . . . Noticeable dissolution of the specimen.

TABLE 5

| Example | 22 | 23 | 24 | 25 | 26 | 27 | 28 | 29 |
|---|---|---|---|---|---|---|---|---|
| PBT (wt %) | 20 | 20 | 20 | 40 | 40 | 50 | 70 | 70 |
| Polycarbonate (wt %) | 80 | 80 | 80 | 60 | 60 | 50 | 30 | 30 |
| Multi-Phase Structure Thermoplastic Resin IIIa* | 10 | 20 | — | 20 | — | 20 | — | 20 |

TABLE 5-continued

| Example | 22 | 23 | 24 | 25 | 26 | 27 | 28 | 29 |
|---|---|---|---|---|---|---|---|---|
| Multi-Phase Structure Thermoplastic Resin IIIb* | — | — | 20 | — | 20 | — | 20 | — |
| Notched Izot Impact Strength (kg · cm/cm) | 90 | 95 | 85 | 85 | 80 | 79 | 70 | 75 |
| Heat Distortion Temperature (°C.) (18.6 kg/cm²) | 110 | 103 | 100 | 93 | 97 | 90 | 95 | 89 |
| Chemical Resistance (appearance) | ○ | ○ | ○ | ○ | ○ | ○ | ○ | ○ |

*Parts by weight based on 100 parts by weight of PBT + polycarbonate.

EXAMPLES 30 TO 35

The same procedure as in the above-mentioned examples was repeated with the exception that the graft polymerization multi-phase structure thermoplastic resins IIIa and IIIb were replaced with the graft precursors IIIa' and IIIb' obtained in Preparation Examples 1 and 2. The results are set forth in Table 6. In the cases of using the graft precursors, functional effects are the same as in the cases of using the graft polymerization multi-phase structure thermoplastic resins.

TABLE 6

| Example | 30 | 31 | 32 | 33 | 34 | 35 |
|---|---|---|---|---|---|---|
| PBT (wt %) | 20 | 20 | 50 | 50 | 70 | 70 |
| Polycarbonate (wt %) | 80 | 80 | 50 | 50 | 30 | 30 |
| Graft Polymerization Precursor IIIa'* | 20 | — | 20 | — | 20 | — |
| Graft Polymerization Precursor IIIb'* | — | 20 | — | 20 | — | 20 |
| Notched Izod Impact Strength (kg · cm/cm) | 95 | 89 | 80 | 77 | 73 | 68 |
| Heat Distortion Temperature (°C.) (18.6 kg/cm²) | 107 | 100 | 86 | 96 | 90 | 92 |
| Chemical Resistance (appearance) | ○ | ○ | ○ | ○ | ○ | ○ |

*Parts by weight based on 100 parts by weight of PBT + polycarbonate.

EXAMPLES 36 TO 41

The same procedure as in the above examples was repeated with the exception that a glass fiber having an average fiber length of 5.0 mm and a diameter of 10 μm was additionally blended. The results are set forth in Table 7.

TABLE 7

| Example | 36 | 37 | 38 | 39 | 40 | 41 |
|---|---|---|---|---|---|---|
| PBT (wt %) | 20 | 20 | 40 | 40 | 70 | 70 |
| Polycarbonate (wt %) | 80 | 80 | 60 | 60 | 30 | 30 |
| Multi-Phase Structure Thermoplastic Resin IIIa* | 20 | — | 20 | — | — | — |
| Multi-Phase Structure Thermoplastic Resin IIIb* | — | 20 | — | — | — | — |
| Graft Polymerization Precursor IIIa'* | — | — | — | 20 | 20 | — |
| Graft Polymerization Precursor IIIb'* | — | — | — | — | — | 20 |

TABLE 7-continued

| Example | 36 | 37 | 38 | 39 | 40 | 41 |
|---|---|---|---|---|---|---|
| Glass Fiber* | 30 | 30 | 30 | 30 | 30 | 30 |
| Notched Izod Impact Strength (kg · cm/cm) | 90 | 88 | 80 | 78 | 80 | 78 |
| Heat Distortion Temperature (°C.) (18.6 kg/cm²) | 128 | 125 | 106 | 110 | 103 | 107 |

*Parts by weight based on 100 parts by weight of PBT + polycarbonate.

COMPARATIVE EXAMPLES 7 TO 14

The same procedure as in Example 1 was repeated with the exception that the multi-phase structure thermoplastic resin in Example 20 was replaced with the ethylene-glycidyl methacrylate copolymer used in Preparation Example 1, the blend obtained in Reference example 2 and the short-chain graft polymer obtained in Reference Example 3. The results are set forth in Table 8.

TABLE 8

| Comp. Example | 7 | 8 | 9 | 10 | 11 | 12 | 13 | 14 |
|---|---|---|---|---|---|---|---|---|
| PBT (wt %) | 20 | 20 | 20 | 50 | 70 | 70 | 70 | 70 |
| Polycarbonate (wt %) | 80 | 80 | 80 | 50 | 30 | 30 | 30 | 30 |
| Ethylene-Glycidyl Methacrylate Copolymer* | — | 10 | 20 | 10 | 20 | 20 | — | — |
| Blend* | — | — | — | — | — | — | 10 | — |
| Short-Chain Graft Polymer* | — | — | — | — | — | — | — | 10 |
| Notched Izod Impact Strength (kg · cm/cm) | 25 | 35 | 45 | 28 | 30 | 18 | 5 | 16 |
| Heat Distortion Temperature (°C.) (18.6 kg/cm²) | 80 | 78 | 75 | 77 | 72 | 75 | 70 | 77 |
| Chemical Resistance (appearance) | X | X | △ | △ | △ | △ | X | X |

*Parts by weight based on 100 parts by weight of PBT + polycarbonate.

EXAMPLES 42 TO 48

Polybutylene terephthalate (which was denoted by PBT in tables) having an intrinsic viscosity of 3.5 dl/g, PPS (trade name Lighton R-4; made by Philips Petroleum Co., Ltd.) and the multi-phase structure thermoplastic resin IIa obtained in Preparation Example 1 were melted and blended together in ratios in Table 9.

Procedures of melting and mixing as well as the formation of specimens were carried out in the same manner as in Example 1. furthermore, layer peeling on the broken portion of each specimen was observed.

TABLE 9

| Example | 42 | 43 | 44 | 45 | 46 | 47 | 48 |
|---|---|---|---|---|---|---|---|
| PBT (wt %) | 20 | 20 | 40 | 50 | 60 | 70 | 80 |
| PPS (wt %) | 80 | 80 | 60 | 50 | 40 | 30 | 20 |
| Multi-Phase Structure Thermoplastic Resin IIIa* | 5 | 15 | 15 | 15 | 15 | 15 | 15 |
| Notched Izod Impact Strength (kg · cm/cm) | 5.0 | 6.0 | 6.3 | 6.2 | 7.3 | 8.0 | 9.5 |
| Heat Distortion Temperature (°C.) (18.6 kg/cm²) | 145 | 140 | 130 | 125 | 103 | 95 | 90 |
| Delamination | none | none | none | none | none | none | none |

*Parts by weight based on 100 parts by weight of PBT + PPS.

EXAMPLES 49 TO 56

The same procedure as in the above examples was repeated with the exception that the graft multi-phase structure thermoplastic resin IIIa was replaced with the graft polymerization precursor IIIa' obtained in Preparation Example 1 and that a glass fiber having an average fiber length of 5.0 mm and a diameter of 10 μm. The results are set forth in Table 10.

COMPARATIVE EXAMPLES 15 TO 21

Apart from these examples, the same procedure as in Example 1 was repeated with the exception that the ethyleneglycidyl methacrylate copolymer used in Preparation Example 1, the blend obtained in Reference Example 2 and the short-chain graft polymer obtained in Reference Example 3. The results are set forth in Table 11.

TABLE 10

| Example | 49 | 50 | 51 | 52 | 53 | 54 | 55 | 56 |
|---|---|---|---|---|---|---|---|---|
| PBT (wt %) | 20 | 20 | 50 | 50 | 50 | 70 | 80 | 80 |
| PPS (wt %) | 80 | 80 | 50 | 50 | 50 | 30 | 20 | 20 |
| Multi-Phase Theremoplastic Resin IIIa* | 15 | — | 15 | — | 15 | — | 15 | — |
| Graft Polymerization Precursor IIIa'* | — | 15 | — | 15 | — | 15 | — | 15 |
| Glass Fiber* | 30 | — | 30 | 30 | 30 | 30 | 30 | — |
| Notched Izod Impact Strength (kg · cm/cm) | 9.5 | 7.0 | 10.1 | 10.5 | 12.0 | 12.7 | 14.0 | 10.0 |
| Heat Distortion Temperature (°C.) (18.6 kg/cm²) | 255 | 143 | 235 | 240 | 215 | 220 | 200 | 85 |

*Parts by weight based on 100 parts by weight of PBT + PPS.

TABLE 11

| Comp. Example | 15 | 16 | 17 | 18 | 19 | 20 | 21 |
|---|---|---|---|---|---|---|---|
| PBT (wt %) | 20 | 50 | 50 | 70 | 80 | 70 | 70 |
| PPS (wt %) | 80 | 50 | 50 | 30 | 20 | 30 | 30 |
| Ethylene-Glycidyl Methacrylate Copolymer *1 | 10 | 10 | 20 | 20 | 20 | — | — |
| Blend *1 | — | — | — | — | — | — | 20 |
| Short-Chain Graft Polymer *1 | — | — | — | — | — | 20 | — |
| Notched Izod Impact Strength (kg · cm/cm) | 3.0 | 4.7 | 5.1 | 6.0 | 7.5 | 6.6 | 2.0 |
| Heat Distortion Temperature (°C.) (18.6 kg/cm²) | 130 | 123 | 118 | 90 | 80 | 87 | 63 |
| Delamination *2 | X | X | Δ | Δ | Δ | Δ | X |

*1 Parts by weight based on 100 parts by weight of PBT + PPS.
*2 "X" means that layer peeling was present, and "Δ" means that it was slightly present.

As described in the above-mentioned examples, the thermoplastic resin composition of the present invention, which has been prepared by using a specific multiphase thermoplastic resin, can improve compatibility with other engineering plastics and can provide various molded articles which are excellent in impact resistance and appearance.

The thermoplastic resin composition of the present invention effectively has different features of the raw material resins, and it is excellent in moldability, impact resistance, heat resistance, dimensional resistance and chemical resistance. The impact resistance and heat resistance of the composition of the present invention can be regulated by suitably selecting a ratio of the multiphase structure thermoplastic resins to be mixed, and therefore the present invention can meet a variety of demands.

As is apparent from the foregoing, the thermoplastic resin composition of the present invention can be widely utilized as materials for, e.g., automobile parts, electrical and electronic machine parts, and other industrial parts.

What is claimed is:

1. A thermoplastic resin composition which comprises:
   (I) 99 to 1% by weight of an aromatic polyester,
   (II) 1 to 99% by weight of at least one kind of resin selected from the group consisting of polyphenylene ether resin, a mixture of the polyphenylene ether resin and a styrene polymer, a polycarbonate resin and a polyarylene sulfide resin,
   (III) 0.1 to 100 parts by weight, based on 100 parts by weight of the aforesaid resins (I)+(II), of a multiphase structure thermoplastic resin formed by melting a mixture which comprises a graft polymerization precursor obtained by copolymerizing at least one vinyl monomer with at least one of radical polymerizable or copolymerizable organic peroxide represented by one of the following general formula (a) and (b)

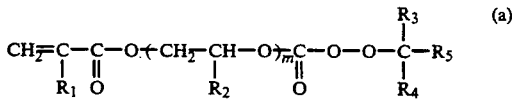

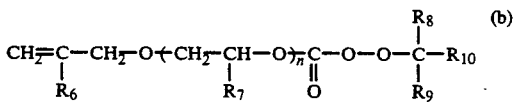

wherein $R_1$ is hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$, and $R_9$ is an alkyl group having 1 to 4 carbon atoms, each of $R_5$ and $R_{10}$ is an alkyl group having 1 to 12 carbon atoms, a phenyl group, and alkyl-substituted phenyl group or a cycloalkyl group having 3 to 12 carbons atoms, m is 0, 1 or 2, and n is 0, 1 or 2,
   in particles of an epoxy group - containing olefin copolymer.

2. A thermoplastic resin composition according to claim 1 wherein the vinyl monomer is at least one vinyl monomer selected from the group consisting of vinyl aromatic monomers, acrylonitrile and methacrylonitrile monomers, and vinyl ester monomers.

3. A thermoplastic resin composition according to claim 1 wherein the epoxy group-containing olefin copolymer is a copolymer composed of 60 to 99.5% by weight of ethylene, 40 to 0.5% by weight of glycidyl acrylate or methacrylate, and 0 to 39.5% by weight of another unsaturated monomer.

4. A thermoplastic resin composition according to claim 1 wherein an inorganic filler (IV) is additionally blended in an amount of 1 to 150 parts by weight based on 100 parts by weight of the thermoplastic resin composition (I)+(II)+(III).

5. A thermoplastic resin composition according to claim 1, wherein the vinyl monomer is at least one monomer selected from the group consisting of acrylate and methacrylate monomers.

* * * * *